_US005335214A_

United States Patent [19]
Matoba et al.

[11] Patent Number: 5,335,214
[45] Date of Patent: Aug. 2, 1994

[54] OPTICAL RECORDING TRACK ACCESS DRIVING APPARATUS

[75] Inventors: Hirotsugu Matoba, Sakurai; Masaru Nomura, Tenri; Takeshi Yamaguchi, Sakai, all of Japan

[73] Assignee: Sharp Kabushiki Kaisha, Osaka, Japan

[21] Appl. No.: 923,745

[22] Filed: Jul. 28, 1992

[30] Foreign Application Priority Data

Aug. 2, 1991 [JP] Japan .................................. 3-194336

[51] Int. Cl.$^5$ ............................................ G11B 7/09
[52] U.S. Cl. ........................ 369/44.28; 369/44.25; 369/44.29; 369/44.35
[58] Field of Search ........... 369/44.28, 44.25, 44.29, 369/44.34, 44.35, 44.27, 32, 44.26

[56] References Cited

U.S. PATENT DOCUMENTS

| | | | |
|---|---|---|---|
| 4,730,294 | 3/1988 | Funada | 369/44.35 |
| 4,974,220 | 11/1990 | Harada | 369/44.26 |
| 5,051,972 | 9/1991 | Yamamuro | 369/32 |

FOREIGN PATENT DOCUMENTS

| | | |
|---|---|---|
| 0277793 | 8/1988 | European Pat. Off. . |
| 0289143 | 11/1988 | European Pat. Off. . |
| 57-37742 | 3/1982 | Japan . |
| 61-233430 | 10/1986 | Japan . |
| 62-202360 | 9/1987 | Japan . |
| 63-232516 | 9/1988 | Japan . |

*Primary Examiner*—W. R. Young
*Assistant Examiner*—Muhammad Edun

[57] ABSTRACT

An optical recording medium driving apparatus has the first high-pass filter for outputting a low frequency component removed signal by removing a low frequency component from a reproduction signal varying depending on a reflected light beam from the optical recording medium. The low frequency component removed signal changes due to transient response just after an access operation starts. Zero voltage is inputted to the second high-pass filter during a tracking operation while a voltage having a negative polarity which is substantially the same amplitude as the AC component of the low frequency component removed signal is inputted to the second high-pass filter. The first high-pass filter has the same time constant as the second high-pass filter. Just after the access operation starts, the negative voltage has the same transient response as the output of the first high-pass filter. The output of the first high-pass filter is compared to the output of the second high-pass filter in order to have a binary signal of the binary logic condition. A land is discriminated from a groove according to the binary signal, thereby enabling to access a target track in accuracy.

22 Claims, 4 Drawing Sheets

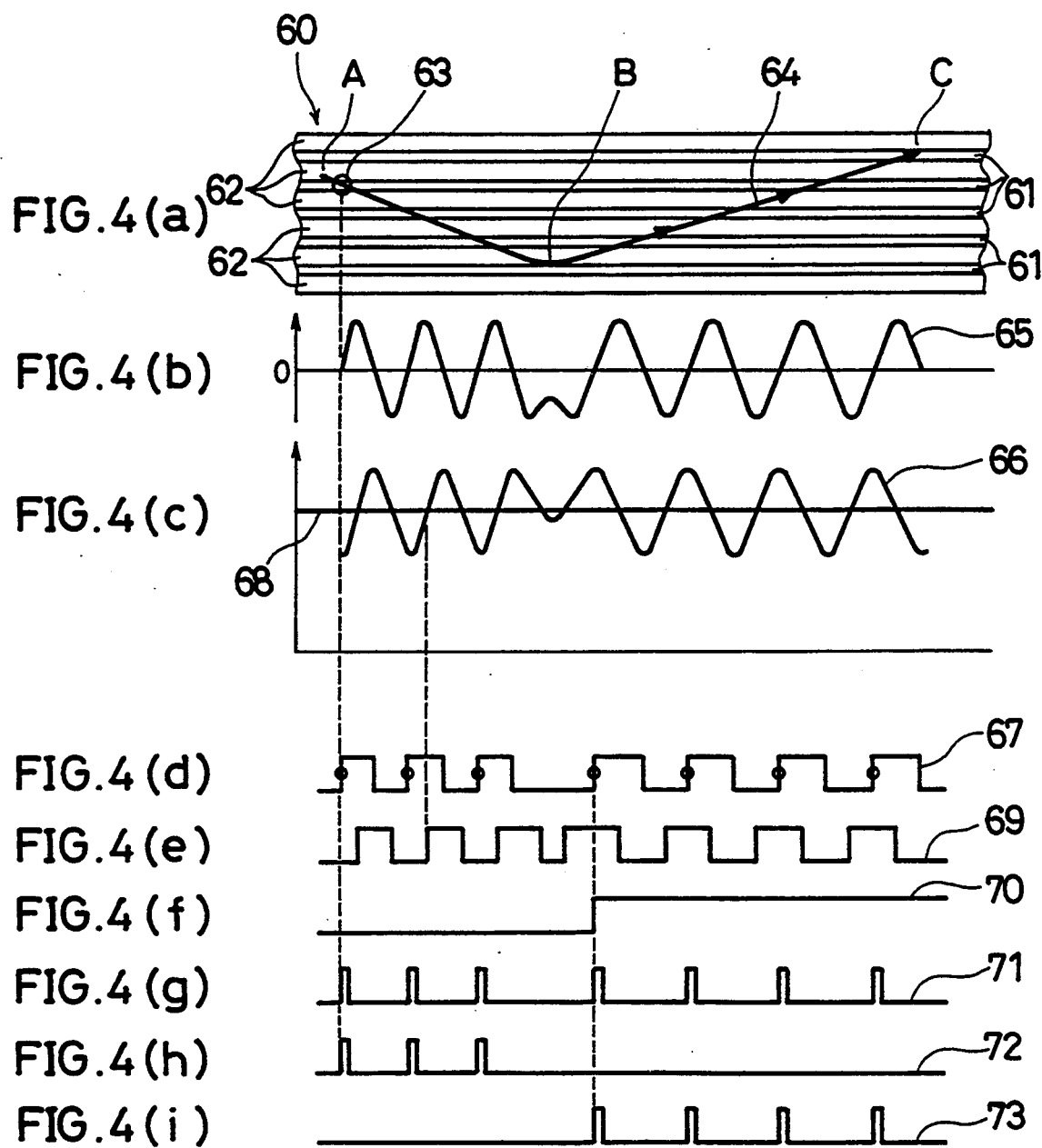

OPTICAL RECORDING TRACK ACCESS DRIVING APPARATUS

FIELD OF THE INVENTION

The present invention relates to optical recording medium driving apparatuses for recording, reproducing, or erasing information on or from an optical recording medium, and more particularly relates to an optical recording medium driving apparatuses which performs track access wherein an optical head is moved to a target track.

BACKGROUND OF THE INVENTION

A variety of track access systems have been proposed in connection with conventional optical disk driving apparatuses. The following is one of those track access systems, i.e., so called a track counting system. The track counting system is arranged such that moving means such as a linear motor causes an optical head to move to a target track from the current position which is detected according to the number of the pulses of a traverse signal, the traverse signal being detected by the optical head and varying depending on the number of the tracks that the optical head actually crossed.

The following describes the conventional track counting system. As shown in FIG. 4(a), the surface of an optical disk 60 is provided with guide grooves 61 having a predetermined distance therebetween with respect to a radial direction of the optical disk 60. Each track 62 is defined between two adjacent guide grooves 61.

A light beam 63 moves with respect to the radial direction of the optical disk 60 while crossing the tracks 62 along, for example, an arrow 64. It is assumed that the light beam 63 moves from the inner part of the optical disk 60 toward the outer part thereof during the zone defined by A and B as shown in FIG. 4(a) when track access is performed. It is also assumed that the light beam 63 moves from the outer part of the optical disk 60 toward the inner part thereof during the zone defined by B and C as shown in FIG. 4(a) when the track access is performed. Further, the light beam 63 actually moves in a direction perpendicular to the track 62 or substantially perpendicular to the track 62 during the track access. However, the light beam 63 on the optical disk 60 traces such that the light beam 63 crosses in a direction diagonal to the track 62, since the optical disk 60 ordinarily rotates even when the track access is performed.

A tracking error signal 65 changes as shown in FIG. 4(b) when the light beam 63 moves along the arrow 64. A total signal 66 changes as shown in FIG. 4(c) when the light beam 63 moves along the arrow 64. The tracking error signal 65 becomes zero in the center of the track 62 in a width direction thereof. The total signal 66 becomes a maximum in the center of the track 62 in the width direction thereof.

In addition, the tracking error signal 65 is given by a difference signal between the outputs from the respective photoreceiving parts of a divided photodetector (not shown), for example. The total signal 66 is given by a sum signal between the outputs from the respective photoreceiving parts of the divided photodetector.

A binary tracking error signal 67 is shown in FIG. 4(d), the binary tracking error signal 67 being given by making the tracking error signal 65 in a binary logic condition. A land/groove discrimination signal 69 is shown in FIG. 4(e), the land/groove discrimination signal 69 being given by comparison of the total signal 66 to a slice level 68 (see FIG. 4(c)) by means of a comparator (not shown) making the compared result in the binary logic condition. Each guide groove 61 (groove) corresponds to a low level of the land/groove discrimination signal 69. Each track 62 (land) corresponds to a high level of the land/groove discrimination signal 69.

A direction signal 70 is shown in FIG. 4(f), the direction signal 70 being given by latching a level of the land/groove discrimination signal 69 in response to a rising edge of the binary tracking error signal 67. The direction signal 70 becomes a low level when the light beam 63 moves from the inner part of the optical disk 60 toward the outer part thereof. The direction signal 70 becomes a high level when the light beam 63 moves from the outer part of the optical disk 60 toward the inner part thereof.

An edge detection signal 71 is shown in FIG. 4(g), the edge detection signal 71 containing pulses, each of which is outputted for a predetermined time from a rising edge of the binary tracking error signal 67. The edge detection signal 71 corresponds to a timing that the light beam 63 crosses the guide groove 61 when the light beam 63 moves from the inner part of the optical disk 60 toward the outer part thereof. The edge detection signal 71 corresponds to a timing that the light beam 63 crosses the track 62 when the light beam 63 moves from the outer part of the optical disk 60 toward the inner part thereof.

A up-signal 72 is shown in FIG. 4(h) and a down-signal 73 is shown in FIG. 4(i). The respective signals 72 and 73 are given by the selection of the edge detection signal 71 according to a logic level, i.e., high level or low level of the binary logic condition. More specifically, the up-signal 72 is generated in response to the edge detection signal 71 when the direction signal 70 is a low level. The down-signal 73 is generated in response to the edge detection signal 71 when the direction signal 70 is a high level. The number of the pulses of the up-signal 72 corresponds to the number of the tracks 62 which the light beam 63 crossed when it moves from the inner part of the optical disk 60 toward the outer part thereof. The number of the pulses of the down-signal 73 corresponds to the number of the tracks 62 which the light beam 63 crossed when it moves from the outer part of the optical disk 60 toward the inner part thereof.

Accordingly, the amount of movement of the optical head with respect to the radial direction of the optical disk 60 can be detected when a up/down counter (not shown) counts the up-signal 72 and the down-signal 73.

However, there are some cases where an accurate amount of movement of the optical head with respect to the radial direction can not detected in the above-mentioned conventional optical disk driving apparatus.

The following is an example of such cases. The total signal is effected when an optical disk having different reflectance is loaded into the apparatus. This causes a DC component and an AC component of the total signal to change. A total signal of an optical disk has the characteristic that the ratio of a DC level with respect to an AC component amplitude is relatively great. Therefore, when the total signal is compared to a predetermined slice level even though the total signal is effected by the reflectance change of the loaded optical disk, the amount of movement of the optical head can not detected with accuracy in this case.

Some restrictions can be given by adopting a standard and keeping thereof with regard to the problem of the different reflectance. However, the tolerance is too wide for the accurate discrimination. This causes the apparatus to misjudge the direction in which the optical head moves and causes the up/down counter to count in a wrong manner. This results in a problem that the detection of the position where the optical head is located can not be performed accurately.

In order to overcome the above-mentioned difficulties, the following method is proposed: when an optical disk is loaded into the apparatus, a total signal is sampled to have the average thereof and is adopted as a slice level for the comparison. However, this proposed method causes the apparatus to have a large scale circuit configuration. Moreover, another slice level must be set depending on the position of the optical head when a disk having a large distribution of the reflectance is loaded into the apparatus. This is not a practical way of overcoming the above-mentioned difficulties.

SUMMARY OF THE INVENTION

It is an object of the present invention to avoid the effect on a reproduction signal due to the reflectance difference even when a recording medium having a different reflectance is loaded into a recording medium driving apparatus, thereby having an accurate access to a target track.

In order to achieve the foregoing object, the optical recording medium driving apparatus of the present invention using an optical recording medium, such as an optical disk of CD (Compact Disk), having alternate lands and grooves in a radial direction of the optical recording medium and having an optical head for projecting a light beam onto the optical recording medium and for receiving a reflected light beam from the optical recording medium, the reflected light beam bearing a reproduction signal, is characterized by comprising:

(a) first low frequency component removing means, such as a high-pass filter, for removing a low frequency component from the reproduction signal;

(b) reference voltage generation means, such as switching means and control means thereof, for outputting first reference voltage, for example zero voltage, during performing a tracking operation and for outputting second reference voltage, for example a voltage having the same amplitude as the output of the first low frequency component removing means, during performing a track access operation;

(c) second low frequency component removing means, such as a high-pass filter, for changing the output of the reference voltage generation means according to a time constant which is substantially the same as the one of the first low frequency component removing means; and (d) comparator means for comparing the output of the first low frequency component removing means to the output of the second low frequency component removing means.

With the arrangement, accurate access to a target track is achieved since an accurate moving distance and an accurate moving direction of the optical head can be detected without an effect on a reproduction signal due to the reflectance difference even when a recording medium having a different reflectance is loaded into the recording medium driving apparatus.

More specifically, the optical recording medium is scanned by the optical head after the recording medium having a different reflectance is loaded into the recording medium driving apparatus. As a result, both DC component and AC component of the reproduction signal change due to the reflectance difference. The DC component, i.e., the low frequency component, is removed from the reproduction signal by the first low frequency component removing means. The high frequency component changes according to the time constant due to a transient response which occurs just upon starting of the access operation of the light beam after the scanning operation. And the changed high frequency component is inputted to the comparator means.

In addition, the first reference voltage or the second reference voltage of the reference voltage generation means is inputted to the second low frequency component removing means and changes according to the substantially the same time constant as the first low frequency component removing means. The changed reference voltage is inputted to the comparator means. In other words, the first reference voltage or the second reference voltage is changed according to the above-mentioned time constant and thereafter it becomes zero level.

The comparator means compares the output of the first low frequency component removing means to the output of the second low frequency component removing means for the purpose of having a binary signal of a binary logic condition, i.e., 1 and 0. The discrimination of the land from the groove is made according to the binary signal from the comparator means.

For example, it is assumed that the first reference voltage is set to zero voltage and the second reference voltage is set to the voltage having a negative polarity which is substantially the same amplitude as the output of the first low frequency component removing means. The high frequency component of the reproduction signal is compared to the zero voltage for having the binary logic condition during the tracking operation. In contrast, the high frequency component of the reproduction signal is compared to the second reference voltage which changes according to the time constant for having the binary logic condition during the track access operation. Note that the second reference voltage changes according to the same time constant as the one of the the high frequency component of the reproduction signal which may change due to the transient response just after starting the access operation. Accordingly, the comparator means has no effect on its output even when the AC component of the reproduction signal changes due to the reflectance difference and the transient response occurs just after starting the access operation.

For a fuller understanding of the nature and advantage of the invention, reference should be made to the ensuing detailed description taken in conjunction with the accompanying drawings.

BRIEF DESCRIPTION OF THE DRAWINGS

FIG. 1(a)-1(m) are time charts showing the operation of each portion of the optical recording medium driving apparatus of the present invention;

FIG. 2 is a block diagram showing the whole structure of the optical recording medium driving apparatus; and FIG. 3 is a circuit diagram showing a land/groove discrimination circuit.

FIGS. 4(a) to 4(c) illustrates an embodiment of prior art with the drawing including a time chart showing the operation of each portion of the apparatus.

DESCRIPTION OF THE EMBODIMENTS

Figure 1:
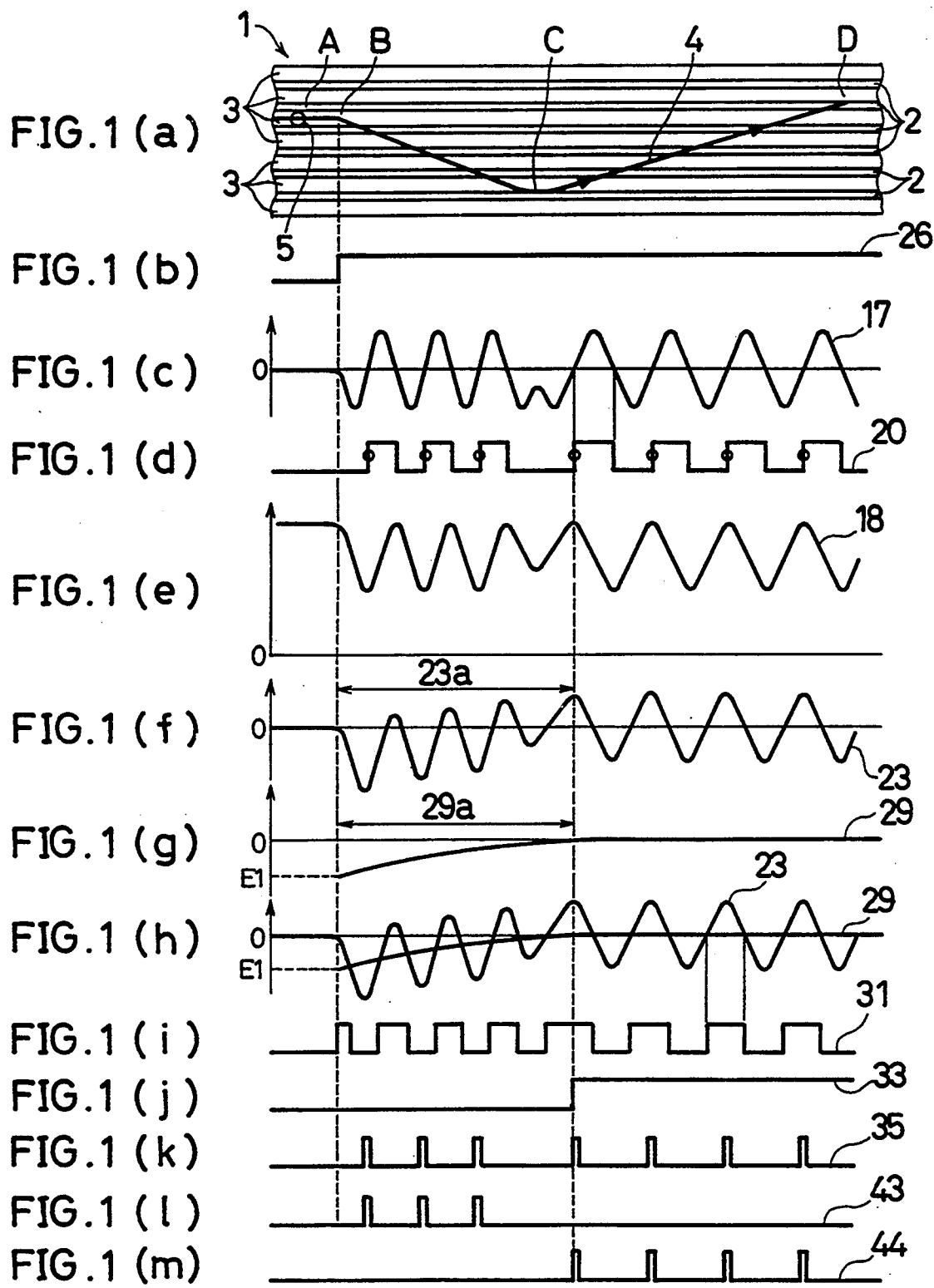
FIGS. 1 through 3 show one embodiment of the present invention.
Figure 2:
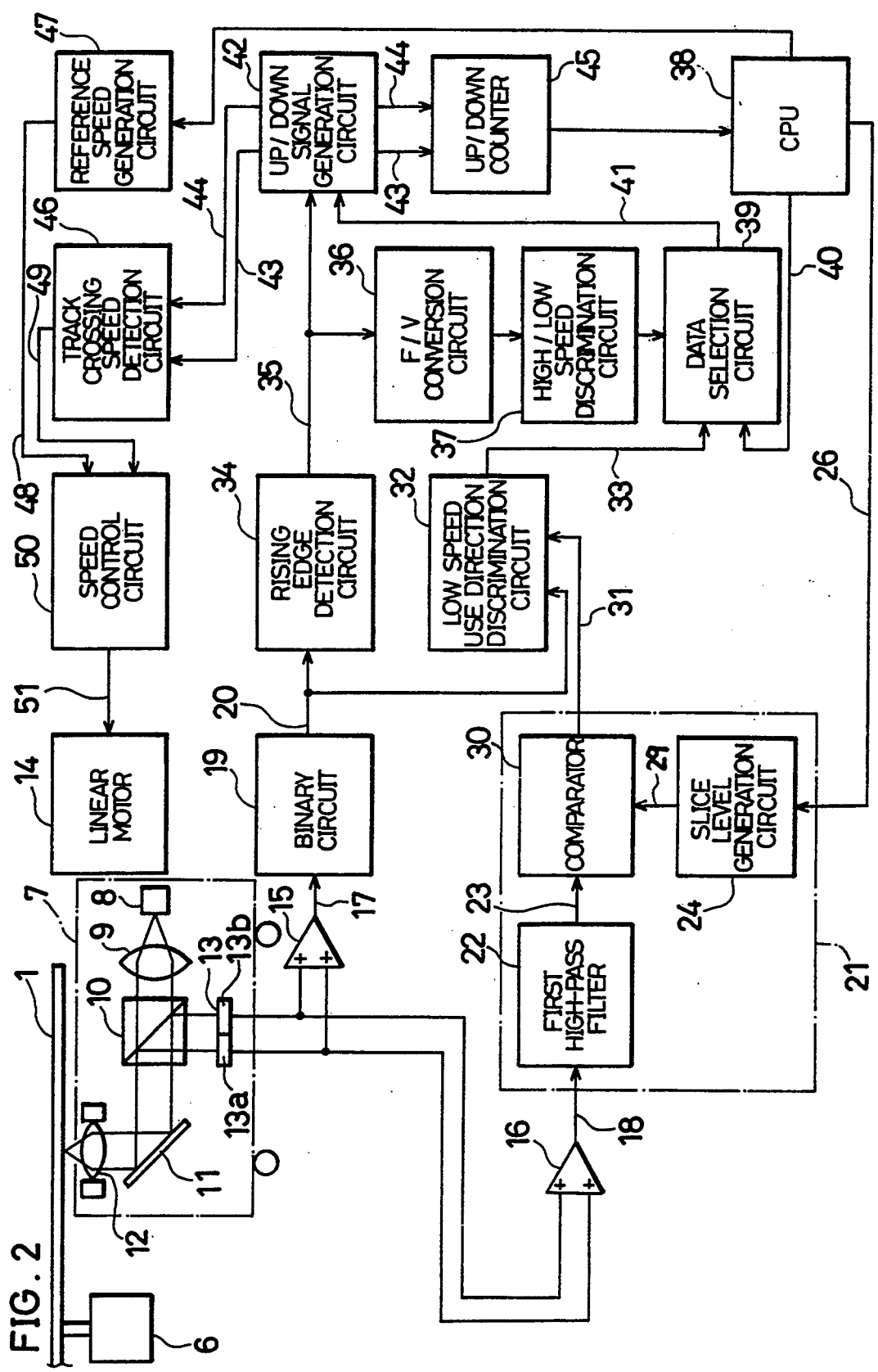
Figure 3:
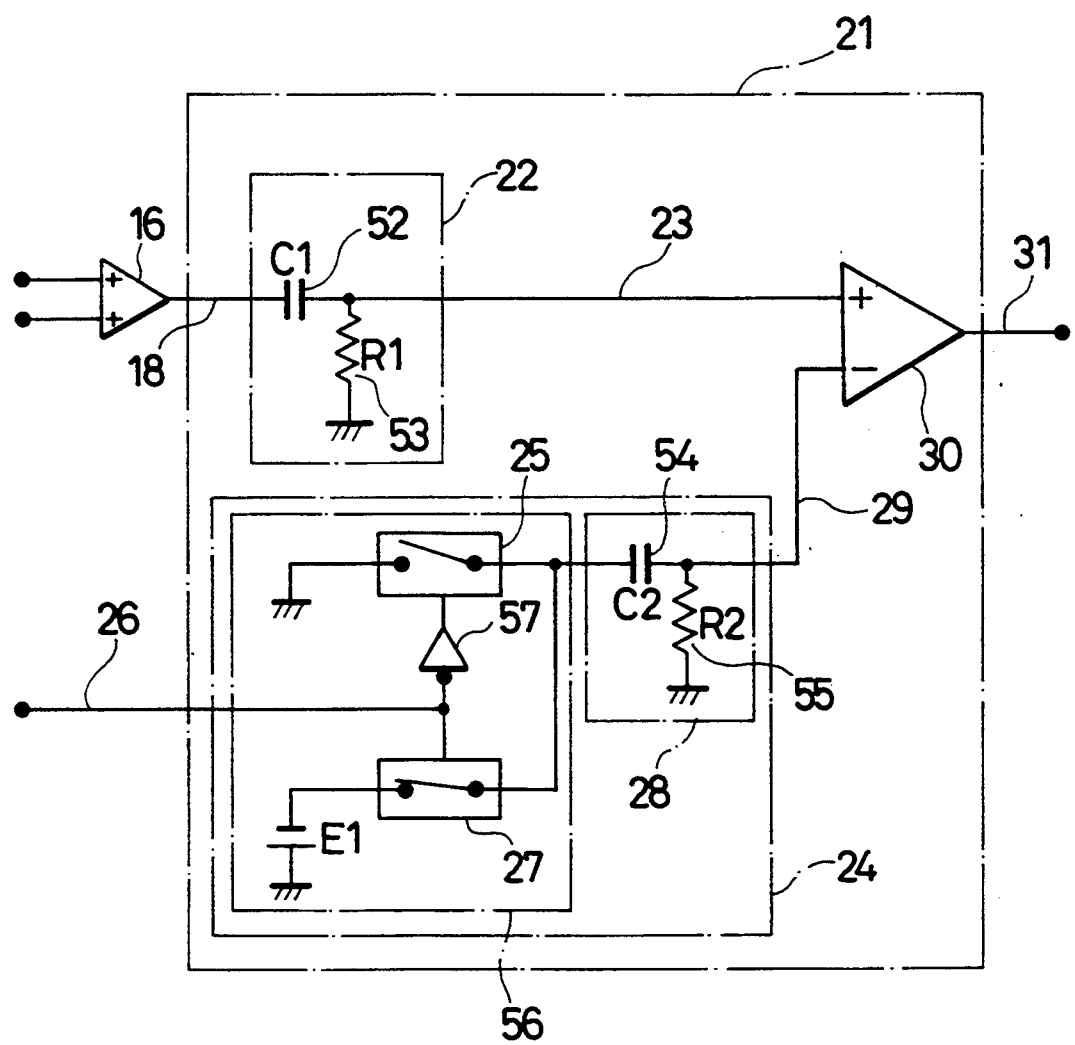

The following description describes one embodiment of the present invention with reference to FIGS. 1 through 3.

An optical disk 1 (optical recording medium) has guide grooves 2 formed therebetween concentrically or spirally in a predetermined distance as shown in FIG. 1(a). A track 3 (land) is provided between two adjacent guide grooves 2. The optical disk 1 is a magneto-optical disk, a CD, and other optical recording medium.

An arrow 4 indicates one example of the trace of a light beam 5 on the optical disk 1 during a track access operation. It is assumed that the light beam 5 performs a tracking of the track 3 in the zone defined by A and B of FIG. 1(a) and assumed that the light beam 5 stops tracking from point B and thereafter it starts performing track access. It is also assumed that the light beam 5 moves from the inner part of the optical disk 1 toward the outer part thereof in the zone defined by B and C and assumed that the light beam 5 moves from the outer part of the optical disk 1 toward the inner part thereof in the zone defined by C and D.

The light beam 5 may move in an inverse direction with respect to the ordinary access direction in the zone defined by B and C. This occurs after the access just starts. More specifically, just after starting the access operation, the light beam 5 moves relatively slowly in a radial direction of the optical disk 1 and further the track 3 moves with respect to the radial direction in a faster speed than the light beam 5 moves in the same radial direciton since the optical disk 1 rotates eccentrically. Accordingly, the relative direction in which the light beam 5 moves with respect to the moving direction of the track 3 becomes inverse with respect to the direction in which the light beam 5 actually moves.

As shown in FIG. 2, an optical disk driving apparatus (optical recording medium driving apparatus) is arranged such that a spindle motor 6 supports the optical disk 1 and an optical head 7 records, reproduces, or erases information on or from the optical disk 1 while the optical disk 1 rotates in a predetermined rotation speed.

In the optical head 7, laser light emitted from a semiconductor laser 8 is directed to a collimator lens 9 for converging the incident laser light into parallel light beam. The parallel light beam is directed to a beam splitter 10 and is transmitted by the beam splitter 10. The transmitted light beam is guided to a reflection mirror 11 and is reflected thereby in a substantially perpendicular direction. Thereafter, the reflected light beam is converged on the optical disk 1 through a condensing lens 12.

A reflected light beam from the optical disk 1 reaches the beam splitter 10 through the condensing lens 12 and the reflection mirror 11. The beam splitter 10 vertically reflects the incident light beam to a divided photodetector 13. Further, the optical head 7 is moved in a radial direction of the optical disk 1 by optical head moving means such as a linear motor 14.

The current output signals of light receiving portions 13a and 13b of the divided photodetector 13 are inputted to a subtracter 15 and an adder 16 respectively. The subtracter 15 produces a tracking error signal 17 (see FIG. 1(c)). The adder 16 produces a total signal 18 as a reproduction signal (see FIG. 1(e)).

As shown in FIG. 2, the tracking error signal 17 is inputted to a binary circuit 19. The binary circuit 19 compares the tracking error signal 17 to zero level and outputs a binary tracking error signal 20 (see FIG. 1(d)). The binary tracking error signal 20 is inputted to both low speed use direction discrimination circuit 32 and rising edge detection circuit 34.

As also shown in FIG. 2, the total signal 18 is inputted to a land/groove discrimination circuit 21.

FIG. 3 shows one embodiment of the land/groove discrimination circuit 21. The land/groove discrimination circuit 21 comprises a first high-pass filter 22 (first low frequency component removing means), a slice level generation circuit 24 (slice level generation means), and a comparator 30 (comparator means).

The first high-pass filter 22 is provided with a capacitor 52 having a electrostatic capacity of C1 which is connected with a plus input terminal of the comparator 30, and a resistor 53 having a resistance of R1 which is connected between the plus input terminal and the circuit ground.

When the total signal 18 passes through the first high-pass filter 22, a DC component having a frequency not more than a cut-off frequency f1 (Hz) of the high-pass filter 22 is removed from the total signal 18 and becomes a low frequency component removed signal 23 which is inputted to the comparator 30. The cut-off frequency f1 is given by the following equation: $f1 = 1/(2\pi \cdot C1 \cdot R1)$.

Note that the cut-off frequency f1 is desirably not more than an eccentric frequency which is identical with the rotation frequency of the optical disk since it is necessary to remain the eccentric frequency component in the total signal 18.

The low frequency component removed signal 23 has a transient response like 23a of FIG. 1(f) due to the effect of the first high-pass filter 22 just after the light beam 5 starts the access operation. Misjudgement is likely to occur when the discrimination between land and groove is made according to the result that the transiently responsed low frequency component removed signal 23 is sliced by the zero level. In order to avoid the misjudgement like the above, the present apparatus is provided with the slice level generation circuit 24.

The slice level generation circuit 24 comprises a reference voltage generation circuit 56 (reference voltage generation means) and a second high-pass filter 28 (second low frequency component removing means).

The reference voltage generation circuit 56 comprises a switch 25 (first switching means), a switch 27 (second switching means), and inverter circuit 57 (switching control means). The switch 25 is on when a tracking stop signal 26, which will be mentioned hereinbelow, is a low level while the switch 25 is off when the tracking stop signal 26 is a high level. The switch 27 is on when the tracking stop signal 26 is a high level while the switch 25 is off when the tracking stop signal 26 is a low level. The inverter circuit 57 controls the respective switchings of the switch 25 and the switch 27 in response to the tracking stop signal 26.

The tracking stop signal 26 (see FIG. 1(b)) is outputted by a CPU (Central Processing Unit) 38 just prior to starting of the track access, the stop signal 26 being for stopping the tracking operation of the light beam 5. More specifically, the tracking operation is not performed when the tracking stop signal 26 is a high level while the tracking operation is performed when the tracking stop signal 26 is a low level.

The second high-pass filter 28 is provided with a capacitor 54 having a electrostatic capacity of C2 which is connected with a minus input terminal of the comparator 30 and a resistor 53 having a resistance of R1 which is connected between the minus input terminal and the circuit ground.

When the light beam 5 is located in the zone defined between A and B where the tracking operation is performed, zero voltage (first reference voltage) is applied to the second high-pass filter 28 since the tracking stop signal 26 is a low level. When the light beam 5 is located in the zone defined between B and D where the access operation is performed, voltage E1 (second reference voltage) is applied to the second high-pass filter 28 since the tracking stop signal 26 is a high level.

Note that the voltage E1 is set to the voltage having a negative polarity which is substantially the same amplitude as the AC component of the total signal 18. Note also that the time constant $C2 \times R2$ of the second high-pass filter 28 is set so as to be substantially identical with the time constant $C1 \times R1$ of the first high-pass filter 22. Therefore, a slice signal 29 is outputted from the slice level generation circuit 24, the slice signal 29 changing from $-E1$ according to the time constant $C2 \times R2$ like 29a of FIG. 1(g). The slice signal 29 is inputted to the comparator 30.

The comparator 30 compares the low frequency component removed signal 23 to the slice signal 29 (see FIG. 1(h)) and outputs a land/groove discrimination signal 31 (see FIG. 1(i)). Each low level of the signal 31 corresponds to the guide groove 2 (groove) and each high level of the signal 31 corresponds to the track 3 (land).

The land/groove discrimination signal 31 and the binary tracking error signal 20 are inputted to the low speed use direction discrimination circuit 32 as shown in FIG. 2. The circuit 32 latches the land/groove discrimination signal 31 in response to a rising edge denoted as a small circle of FIG. 1(d) and outputs a low speed use direction signal 33 which corresponds to a direction in which the light beam 5 moves (see FIG. 1(j)). A low level of the low speed use direction signal 33 indicates that the light beam 5 moves from the inner part of the optical disk 1 toward the outer part thereof. A high level of the signal 33 indicates that the light beam 5 moves from the outer part of the optical disk 1 toward the inner part thereof. The low speed use direction signal 33 is inputted to a data selection circuit 39.

The binary tracking error signal 20 is inputted to a rising edge detection circuit 34. The rising edge detection circuit 34 outputs an edge detection signal 35 (see FIG. 1(k)) for a predetermined period upon reception of a rising edge of the signal 20. The edge detection signal 35 corresponds to a timing that the light beam 5 crosses the guide groove 2 when the light beam 5 moves from the inner part of the optical disk 1 toward the outer part thereof. In contrast, the edge detection signal 35 corresponds to a timing that the light beam 5 crosses the track 3 when the light beam 5 moves from the outer part of the optical disk 1 toward the inner part thereof. The edge detection signal 35 is inputted to both a F/V conversion circuit 36 and a up/down signal generation circuit 42.

The F/V conversion circuit 36 converts a frequency signal into a voltage signal for the inputted edge detection signal 35. The F/V conversion circuit 36 outputs an absolute value of the speed at which the light beam 5 crosses the track of the optical disk. The output signal of the the F/V conversion circuit 36 is inputted to a high/low speed discrimination circuit 37 which compares the output signal to a predetermined level. The high/low speed discrimination circuit 37 outputs a discrimination signal which indicates that the crossing speed of the light beam 5 is not less than a predetermined speed or is less than the predetermined speed in accordance with the result of the above-mentioned comparison in the circuit 37.

In the access operation, the CPU 38 recognizes a direction in which the optical head 7 moves by the comparison of the positions between a target track and a current track upon reception of the instruction to perform the access operation. However, as previously mentioned, the CPU 38 may recognize that the light beam 5 moves in the inverse direction due to the effect of the eccentric rotation of the optical disk 1 when the optical head 7 moves at a relatively low speed (see the zone defined by B and C of FIG. 1(a)).

More specifically, when the optical disk 1 rotates eccentrically, the light beam 5 crosses the same track 3 (or guide groove 2) as the one which the light beam 5 has previously crossed even though it is assumed that the optical head 7 stays in a predetermined radial direction. Accordingly, the relative direction in which the light beam 5 moves with respect to the track 3 becomes inverse with respect to the direction in which the light beam 5 actually moves, i.e., the direction in which the CPU 38 recognizes when the following condition is satisfied: the light beam 5 moves relatively slowly in a radial direction of the optical disk 1 and further the track 3 moves with respect to the radial direction in a faster speed than the light beam 5 moves in the same radial direction since the optical disk 1 rotates eccentrically. In other words, when the light beam 5 moves relatively slowly in the radial direction of the optical disk 1, the direction in which the CPU 38 recognizes as the moving direction of the optical head 7 does not always coincide with the direction in which the light beam 5 moves with respect to the track 3.

In contrast, when the light beam 5 moves relatively fast in the radial direction of the optical disk 1, the direction which the CPU 38 recognizes coincides with the direction in which the light beam 5 moves with respect to the track 3. This is because the light beam 5 moves faster than the track 3 moves eccentrically.

In conclusion, a detection of the moving direction of the light beam 5 can be achieved in accuracy when the following is considered: the direction is adopted which the CPU 38 recognizes as the moving direction of the optical head 7 according to the distance between the target track and the current track when the light beam 5 moves relatively fast in the radial direction of the optical disk 1; and in contrast, the direction is adopted which is detected by the low speed use direction discrimination circuit 32 when the light beam 5 moves relatively slowly in the radial direction of the optical disk 1.

Therefore, the following three signals are inputted to the data selection circuit 39: the output signal from the high/low speed discrimination circuit 37; the low speed use direction signal 33; and an access direction signal 40 from the CPU 38. According to the output signal from the high/low speed discrimination circuit 37, the data selection circuit 39 selects the low speed use direction signal 33 of the low speed use direction discrimination circuit 32 when the light beam 5 moves at a relatively slow speed, while selects the access direction signal 40 which is recognized by the CPU 38 when the light beam 5 moves at a relatively fast speed. And the high/low speed discrimination circuit 37 outputs a direction signal 41 in response to the selected signal.

The edge detection signal 35 and the direction signal 41 are inputted to the up/down signal generation circuit 42. The up/down signal generation circuit 42 generates a up-signal 43 (see FIG. 1(1)) in response to the edge detection signal 35 when the direction signal 41 is a low level. The generation circuit 42 generates a down-signal 44 (see FIG. 1(m)) in response to the edge detection signal 35 when the direction signal 41 is a high level. Here, it is assumed that the direction signal 41 is equal to the low speed use direction signal 33 of FIG. 1(j). The up-signal 43 and the down-signal 44 are inputted to both a up/down counter 45 and a track crossing speed detection circuit 46.

The up-signal 43 corresponds to a timing that the light beam 5 crosses the guide groove 2 when the light beam 5 moves from the inner part of the optical disk 1 toward the outer part thereof. In contrast, the down-signal 44 corresponds to a timing that the light beam 5 crosses the track 3 when the light beam 5 moves from the outer part of the optical disk 1 toward the inner part thereof.

The up/down counter 45 is incremented in response to the up-signal 43 or is decremented in response to the down-signal 44, thereby enabling to detect how many tracks the light beam 5 crossed. This can be detected, as previously described, even when the optical disk 1 rotates eccentrically.

According to the inputted up-signal 43 and down-signal 44, the track crossing speed detection circuit 46 detects a speed at which the light beam 5 moves in the radial direction of the optical disk 1 during the access operation by means of F/V converter or other means, the detected speed being different from the one obtained by the F/V conversion circuit 36, i.e., this detected speed including information of a direction in which the light beam 5 moves.

The CPU 38 detects the movement amount of the optical head 7 in response to the output of the up/down counter 45 during the access operation and the CPU 38 outputs the detected result to a reference speed generation circuit 47. The reference speed generation circuit 47 outputs a reference speed signal 48 to a speed control circuit 50, the reference speed signal 48 varying depending on the distance between the current track and the target track.

A moving speed signal 49 from the track crossing speed detection circuit 46 and the reference speed signal 48 from the reference speed generation circuit 47 are inputted to the speed control circuit 50. The speed control circuit 50 outputs a speed control signal 51 to the linear motor 14 in response to a difference between the moving speed signal 49 and the reference speed signal 48. The linear motor 14 is controlled such that the movement speed of the optical head 7 coincides with the reference speed, thereby driving the optical head 7 at an optimum speed varying depending on the distance between the current track and the target track.

As described above, the optical disk driving apparatus of the present embodiment is provided with the land/groove discrimination circuit 21. The discrimination circuit 21 includes the first high-pass filter 22, the slice level generation circuit 24, and the comparator 30.

With this arrangement, the low frequency component can only be removed from the total signal 18 by the first high-pass filter 22. Therefore, the effect on the total signal 18 due to the reflectance difference of the optical disk 1 is restricted to the AC component thereof. The AC component is sliced in response to the slice signal 29 which is outputted by the slice level generation circuit 24. The AC component changes due to the transient response just after the light beam 5 starts the access operation, but the slice signal 29 also changes in the second high-pass filter 28 according to the time constant substantially identical with the one of the first high-pass filter 22. More specifically, there is no effect, due to the the reflectance difference of the optical disk 1, on the land/groove discrimination signal 31 from the land/groove discrimination circuit 21. Accordingly, a track access operation can be achieved in accuracy since both moving direction and moving distance of the optical head 7 are accurately detected.

The optical recording medium driving apparatus of the present invention, as above-mentioned, is provided with:

(a) first low frequency component removing means for removing a low frequency component from the reproduction signal;

(b) reference voltage generation means for outputting first reference voltage during performing a tracking operation and for outputting second reference voltage during performing a track access operation;

(c) second low frequency component removing means for changing the output of the reference voltage generation means according to a time constant which is substantially the same as the one of the first low frequency component removing means; and (d) comparator means for comparing the output of the first low frequency component removing means to the output of the second low frequency component removing means.

Therefore, the present invention complies with the transient response of the AC component of the reproduction signal just after starting of the access operation even when a recording medium having a different reflectance is loaded into the recording medium driving apparatus, since the change of the low frequency component is removed from the reproduction signal by the first low frequency component removing means and since both high frequency component of the second low frequency component removing means and the second reference voltage change according to the same time constant. Accordingly, it is achieved to have an accurate access to a target track since an accurate moving distance and an accurate moving direction of the optical head can be detected and since the land is discriminated from the groove in accuracy.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical recording medium driving apparatus using an optical recording medium having alternate lands and grooves in a radial direction of the optical recording medium, the apparatus having an optical head for projecting a light beam onto the optical recording medium and for receiving a reflected light beam from the optical recording medium, the reflected light beam bearing a reproduction signal, comprising:

first low frequency component removing means for removing a low frequency component from the reproduction signal;

slice level generation means for generating a slice level which varies depending on an output from said first low frequency component removing means for removing a low frequency component from the reproduction signal, when shifting from tracking operation to track access operation; and comparator means for comparing the output of said first low frequency component removing means with said slice level emitted by said slice level generation means during a time said shifting from a tracking operation to a track access operation is performed.

2. The optical recording medium driving apparatus as set forth in claim 1, wherein said slice level generation means comprises:

reference voltage generation means for generating a reference voltage; and second low frequency component removing means, connected to said reference voltage generation means, having a time constant substantially identical with a time constant of said first low frequency component removing means, for changing an output of said reference voltage generation means according to said time constant.

3. The optical recording medium driving apparatus as set forth in claim 2, wherein said reference voltage generation means comprises:

first switching means for switching first reference voltage;

second switching means for switching second reference voltage; and switching control means for controlling a switching of said first switching means and said second switching means such that said second reference voltage is outputted to said second low frequency component removing means when shifting from the tracking operation to the track access operation.

4. The optical recording medium driving apparatus as set forth in claim 3, wherein said first reference voltage is set to be a ground level, and said second reference voltage is set to be a DC voltage having a negative polarity which is substantially the same amplitude as an amplitude of an AC component of an output from said first low frequency component removing means.

5. The optical recording medium driving apparatus as set forth in claim 2, wherein said second low frequency component removing means is a high-pass filter including a capacitor and a resistor.

6. The optical recording medium driving apparatus as set forth in claim 2, wherein second low frequency component removing means has a cut-off frequency not more than a rotation frequency of the optical recording medium.

7. The optical recording medium driving apparatus as set forth in claim 2, wherein said first low frequency component means is a high-pass filter.

8. The optical recording medium driving apparatus as claimed in claim 2, wherein said second low frequency component means is a high-pass filter.

9. The optical recording medium driving apparatus as set forth in claim 1, wherein said first low frequency component removing means is a high-pass filter including a capacitor and a resistor.

10. The optical recording medium driving apparatus as set forth in claim 1, wherein said optical recording medium is a magneto-optical disk.

11. The optical recording medium driving apparatus as set forth in claim 1, wherein said optical recording medium is an optical disk.

12. The optical recording medium driving apparatus as set forth in claim 1, wherein said first low frequency component means is a high-pass filter.

13. The optical recording medium driving apparatus as set forth in claim 1, wherein said slice level generation means comprises:

reference voltage generation means for generating a reference voltage.

14. The optical recording medium driving apparatus as claimed in claim 13, wherein the reference voltage generation means includes a switching and control means.

15. The optical recording medium driving apparatus as set forth in claim 1; and second low frequency component removing means connected to a reference voltage generation means, having a time constant of said first low frequency component removing means, for changing an output of the reference voltage generation means according to said time constant.

16. An optical recording medium driving apparatus using an optical recording medium having alternate lands and grooves in a radial direction of the optical recording medium, the apparatus having an optical head for projecting a light beam onto the optical recording medium and for receiving a reflected light beam from the optical recording medium, the reflected light beam bearing a reproduction signal, comprising:

first low frequency component removing means for removing a low frequency component from the reproduction signal;

reference voltage generation means for outputting first reference voltage during performing a tracking operation and for outputting second reference voltage during performing a track access operation;

second low frequency component removing means, having a time constant substantially identical with a time constant of said first low frequency component removing means, for changing an output of said reference voltage generation means according to said time constant; and comparator means for comparing an output of said first low frequency component removing means to the output of said second low frequency component removing means.

17. The optical recording medium driving apparatus as set forth in claim 16, wherein said first low frequency component removing means is a high-pass filter including a capacitor and a resistor.

18. The optical recording medium driving apparatus as set forth in claim 17, wherein said first low frequency component removing means has a cut-off frequency not more than a rotation frequency of the optical recording medium.

19. The optical recording medium driving apparatus as set forth in claim 16, wherein said second low frequency component removing means is a high-pass filter including a capacitor and a resistor.

20. The optical recording medium driving apparatus as set forth in claim 16, wherein said reference voltage generation means comprises:

first switching means for switching first reference voltage;

second switching means for switching second reference voltage; and switching control means for controlling a switching of said first switching means and said second switching means such that said second reference voltage is outputted to said second low frequency component removing means when shifting from the tracking operation to the track access operation.

21. The optical recording medium driving apparatus as set forth in claim 16, wherein said first reference voltage is set to be a ground level, and said second reference voltage is set to be a DC voltage having a negative polarity which is substantially the same amplitude as an amplitude of an AC component of an output from said first low frequency component removing means.

22. A method for driving an optical recording medium having alternate lands and grooves in a radial direction thereof by projecting a light beam onto the optical recording medium and receiving a reflected light beam from the optical recording medium, the reflected light beam bearing a reproduction signal, comprising the steps of:

(a) removing a low frequency component from the reproduction signal contained within the reflected light beam;

(b) generating a slice level which varies depending on the reproduction signal from which the low frequency component is removed (c) performing step (b) at a time shifting from tracking operation to track access is performed; and (d) comparing the slice level generated in step (b) to the reproduction signal from which the low frequency component was removed in step (a).

* * * * *